(12) United States Patent
Chemali et al.

(10) Patent No.: US 7,375,530 B2
(45) Date of Patent: May 20, 2008

(54) METHOD FOR SIGNAL ENHANCEMENT IN AZIMUTHAL PROPAGATION RESISTIVITY WHILE DRILLING

(75) Inventors: Roland E. Chemali, Kingwood, TX (US); Paul Cairns, Houston, TX (US); Tsili Wang, Katy, TX (US); Wallace H. Meyer, Spring, TX (US); Andrew G. Brooks, Tomball, TX (US); Otto N. Fanini, Houston, TX (US); Gulamabbas Merchant, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/299,053

(22) Filed: Dec. 9, 2005

(65) Prior Publication Data

US 2006/0125479 A1   Jun. 15, 2006

Related U.S. Application Data

(63) Continuation-in-part of application No. 10/373,365, filed on Feb. 24, 2003, which is a continuation-in-part of application No. 10/214,436, filed on Aug. 7, 2002, now Pat. No. 6,900,640.

(60) Provisional application No. 60/361,570, filed on Mar. 4, 2002.

(51) Int. Cl.
  *G01V 3/30* (2006.01)
(52) U.S. Cl. ...................................................... 324/339
(58) Field of Classification Search ........ 324/338–346; 702/6, 7, 9; 175/45
See application file for complete search history.

(56) References Cited

U.S. PATENT DOCUMENTS

| 3,014,177 | A | * | 12/1961 | Hungerford et al. | ........ 324/343 |
| 6,181,138 | B1 | * | 1/2001 | Hagiwara et al. | ........... 324/338 |
| 6,308,136 | B1 | | 10/2001 | Tabarovsky et al. | |
| 6,727,706 | B2 | * | 4/2004 | Gao et al. | .................... 324/339 |
| 6,819,111 | B2 | | 11/2004 | Fanini et al. | |
| 2004/0113609 | A1 | | 6/2004 | Homan et al. | ............... 324/202 |
| 2004/0113626 | A1 | | 6/2004 | Wang et al. | ................. 324/339 |
| 2005/0030037 | A1 | | 2/2005 | Fanini et al. | ................ 324/339 |

FOREIGN PATENT DOCUMENTS

GB        2409044 A       6/2005

* cited by examiner

*Primary Examiner*—Reena Aurora
(74) *Attorney, Agent, or Firm*—Madan, Mossman & Sriram, P.C.

(57) ABSTRACT

Cross-component measurements made at a plurality of tool-face angles are processed to remove bias. The amplitude of the resulting sinusoid is used to estimate a distance to an interface in an earth formation.

19 Claims, 10 Drawing Sheets

METHOD FOR SIGNAL ENHANCEMENT IN AZIMUTHAL PROPAGATION RESISTIVITY WHILE DRILLING

CROSS-REFERENCES TO RELATED APPLICATIONS

This application is a continuation-in-part of U.S. patent application Ser. No. 10/373,365 filed on Feb. 24, 2003, which was a continuation-in-part of U.S. patent application Ser. No. 10/214,436 filed on Aug. 7, 2002 now issued as U.S. Pat. No. 6,900,640 on May 31, 2005 and also claimed priority from U.S. Provisional Patent Application Ser. No. 60/361,570 filed on Mar. 4, 2002.

BACKGROUND OF THE INVENTION

1. Field of the Invention

This invention relates generally to drilling of lateral wells into earth formations, and more particularly to the maintaining the wells in a desired position relative to an interface within a reservoir by making measurements during rotation of the bottomhole assembly.

2. Description of the Related Art

To obtain hydrocarbons such as oil and gas, well boreholes are drilled by rotating a drill bit attached at a drill string end. The drill string may be a jointed rotatable pipe or a coiled tube. Boreholes may be drilled vertically, but directional drilling systems are often used for drilling boreholes deviated from vertical and/or horizontal boreholes to increase the hydrocarbon production. Modern directional drilling systems generally employ a drill string having a bottomhole assembly (BHA) and a drill bit at an end thereof that is rotated by a drill motor (mud motor) and/or the drill string. A number of downhole devices placed in close proximity to the drill bit measure certain downhole operating parameters associated with the drill string. Such devices typically include sensors for measuring downhole temperature and pressure, tool azimuth, tool inclination. Also used are measuring devices such as a resistivity-measuring device to determine the presence of hydrocarbons and water. Additional downhole instruments, known as measurement-while-drilling (MWD) or logging-while-drilling (LWD) tools, are frequently attached to the drill string to determine formation geology and formation fluid conditions during the drilling operations.

Boreholes are usually drilled along predetermined paths and proceed through various formations. A drilling operator typically controls the surface-controlled drilling parameters during drilling operations. These parameters include weight on bit, drilling fluid flow through the drill pipe, drill string rotational speed (r.p.m.) of the surface motor coupled to the drill pipe and the density and viscosity of the drilling fluid. The downhole operating conditions continually change and the operator must react to such changes and adjust the surface-controlled parameters to properly control the drilling operations. For drilling a borehole in a virgin region, the operator typically relies on seismic survey plots, which provide a macro picture of the subsurface formations and a pre-planned borehole path. For drilling multiple boreholes in the same formation, the operator may also have information about the previously drilled boreholes in the same formation.

In development of reservoirs, it is common to drill boreholes at a specified distance from fluid contacts within the reservoir. An example of this is shown in FIG. 2 where a porous formation denoted by 105a, 105b has an oil water contact denoted by 113. The porous formation is typically capped by a caprock such as 103 that is impermeable and may further have a non-porous interval denoted by 109 underneath. The oil-water contact is denoted by 113 with oil above the contact and water below the contact: this relative positioning occurs due to the fact the oil has a lower density than water. In reality, there may not be a sharp demarcation defining the oil-water contact; instead, there may be a transition zone with a change from high oil-saturation at the top to high water-saturation at the bottom. In other situations, it may be desirable to maintain a desired spacing from a gas-oil interface. This is depicted by 114 in FIG. 1. It should also be noted that a boundary such as 114 could, in other situations, be a gas-water contact.

In order to maximize the amount of recovered oil from such a borehole, the boreholes are commonly drilled in a substantially horizontal orientation in close proximity to the oil water contact, but still within the oil zone. U.S. Pat. No. RE35386 to Wu et al, having the same assignee as the present application and the contents of which are fully incorporated herein by reference, teaches a method for detecting and sensing boundaries in a formation during directional drilling so that the drilling operation can be adjusted to maintain the drillstring within a selected stratum is presented. The method comprises the initial drilling of an offset well from which resistivity of the formation with depth is determined. This resistivity information is then modeled to provide a modeled log indicative of the response of a resistivity tool within a selected stratum in a substantially horizontal direction. A directional (e.g., horizontal) well is thereafter drilled wherein resistivity is logged in real time and compared to that of the modeled horizontal resistivity to determine the location of the drill string and thereby the borehole in the substantially horizontal stratum. From this, the direction of drilling can be corrected or adjusted so that the borehole is maintained within the desired stratum. The resistivity sensor typically comprises a transmitter and a plurality of sensors. Measurements may be made with propagation sensors that operate in the 400 kHz and higher frequency.

A limitation of the method and apparatus used by Wu is that resistivity sensors are responsive to oil/water contacts for relatively small distances, typically no more than 5 m; at larger distances, conventional propagation tools are not responsive to the resistivity contrast between water and oil. One solution that can be used in such a case is to use an induction logging that typically operate in frequencies between 10 kHz and 50 kHz. U.S. Pat. No. 6,308,136 to Tabarovsky et al having the same assignee as the present application and the contents of which are fully incorporated herein by reference, teaches a method of interpretation of induction logs in near horizontal boreholes and determining distances to boundaries in proximity to the borehole.

An alternative approach to determination of distances to bed boundaries is disclosed in the parent U.S. patent application Ser. No. 10/373,365 of Merchant et al. and U.S. Pat. No. 6,819,111 to Fanini et al. The antenna configuration of the multicomponent tool of the parent application and of Fanini et al. is illustrated in FIG. 3.

Figure 3:
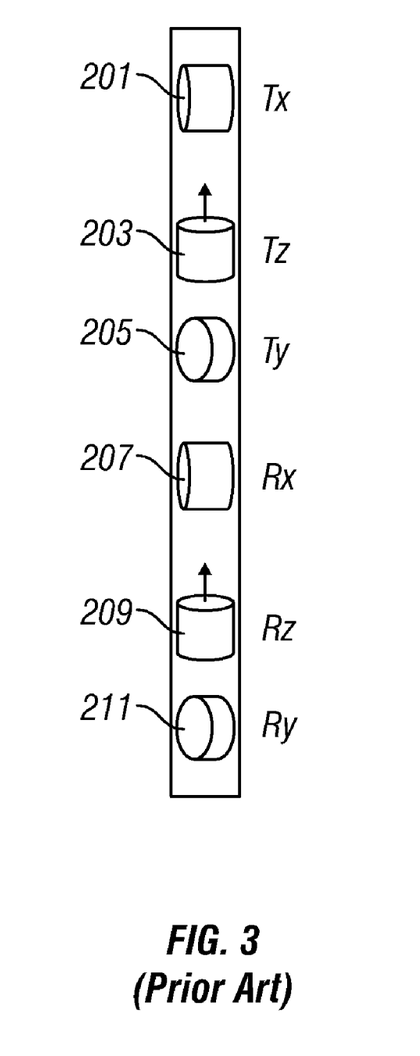

FIG. 3 (prior art) shows the configuration of transmitter and receiver coils in the 3DExplorer™ (3DEX) induction logging instrument of Baker Hughes. Three orthogonal transmitters 201, 203, and 205 that are referred to as the $T_x$, $T_z$, and $T_y$ transmitters are placed in the order shown. The three transmitters induce magnetic fields in three spatial directions. The subscripts (x, y, z) indicate an orthogonal system substantially defined by the directions of the normal to the coils of the transmitters. The z-axis is chosen to be along the longitudinal axis of the tool, while the x-axis and y-axis are mutually perpendicular directions lying in the plane transverse to the axis. Corresponding to each transmitter 201, 203, and 205 are associated receivers 211, 213, and 215, referred to as the $R_x$, $R_z$, and $R_y$ receivers, aligned along the orthogonal system defined by the transmitter normals, placed in the order shown in FIG. 1. $R_x$, $R_z$, and $R_y$ are responsible for measuring the corresponding magnetic fields $H_{xx}$, $H_{zz}$, and $H_{yy}$. Within this system for naming the magnetic fields, the first index indicates the direction of the transmitter and the second index indicates the direction of the receiver. In addition, the receivers $R_y$ and $R_z$, measure two cross-components, $H_{xy}$ and $H_{xz}$, of the magnetic field produced by the $T_x$ transmitter (201). This embodiment of the invention is operable in single frequency or multiple frequency modes. It should further be noted that the description herein with the orthogonal coils and one of the axes parallel to the tool axis is for illustrative purposes only. Additional components could be measured, and, in particular, the coils could be inclined at an angle other than 0° or 90° to the tool axis, and furthermore, need not be orthogonal; as long as the measurements can be "rotated" or "projected" onto three orthogonal axes, the methodology described herein is applicable. Measurements may also be made at a plurality of frequencies, and/or at a plurality of transmitter-receiver distances. The teachings of Merchant and of Fanini show that the 3DEX™ measurements are very useful in determination of distances to bed boundaries (and in reservoir navigation).

SUMMARY OF THE INVENTION

One embodiment of the invention is a method of determining a resistivity of an earth formation. A logging tool is conveyed into a borehole in the earth formation. At least one principal cross-component measurements is obtained at each of a plurality of tool-face angles. The resistivity is determined from the measurements correcting for a bias in the measurements. The determination may be made using a sinusoidal curve fitting. The principal cross-component measurements may include zx-measurements. The principal cross-component measurements may be obtained by exciting a pair of transmitters on opposite sides of a receiver coil. The determined resistivity may be further used to estimate a distance to an interface in the earth formation. The logging tool may be part of a bottomhole assembly conveyed on a drilling tubular and the estimated distance may be used to control a direction of drilling.

Another embodiment of the invention is an apparatus for evaluating an earth formation. The apparatus includes at least one transmitter and at least one receiver conveyed on a logging tool into the earth formation. A processor estimates a resistivity of the formation from at least one principal cross-component measurement obtained from the at least one transmitter and at least one receiver at a plurality of tool-face angles, the estimating correcting for a bias in the measurements. The processor may estimate the resistivity by using a sinusoidal curve fitting. The at least one transmitter may have a coil with an axis parallel to a longitudinal axis of the tool and the at least one receiver may have a coil with an axis transverse to the longitudinal axis. Two or more transmitters may be positioned on either side of a receiver. The processor may further use the estimated resistivity to estimate a distance to an interface in the earth formation. The logging tool may be part of a bottomhole assembly conveyed on a drilling tubular: if so, the processor further controls a direction of drilling based on the estimated distance. The logging tool may be conveyed into the borehole on a wireline. The apparatus may also include an orientation device which provides an output indicative of the toolface angle of the logging tool. The processor may rotate the measurements made by the transmitter and receiver to obtain the principal cross-component.

Another embodiment of the invention is a computer readable medium for use with an apparatus for determining a resistivity of an earth formation. The apparatus includes at least one transmitter and at least one receiver on a logging tool conveyed in a borehole in the earth formation. The medium includes instructions which enable a processor to estimate the resistivity from at least one principal cross-component measurement at a plurality of toolface angles, the estimate correcting for a bias in the measurements. The medium may be a ROM, an EAROM, an EPROM, an EEPROM, a flash memory, and/or an optical disk.

BRIEF DESCRIPTION OF THE DRAWINGS

For detailed understanding of the present invention, reference should be made to the following detailed description of the preferred embodiment, taken is conjunction with the accompanying drawings, in which like elements have been given like numerals and wherein.

DETAILED DESCRIPTION OF THE INVENTION

Figure 1:
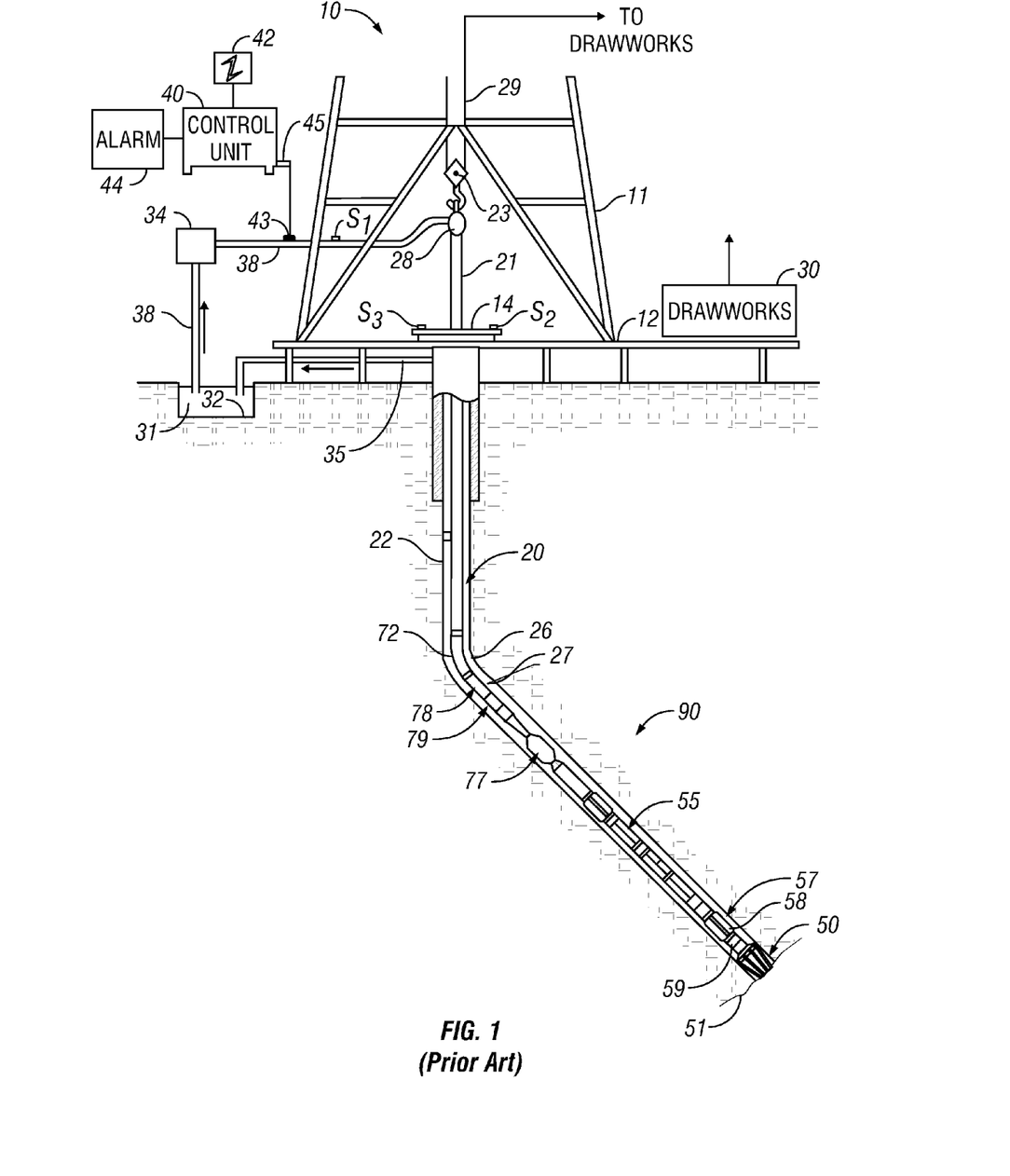
FIG. 1 shows a schematic diagram of a drilling system having a drill string that includes a sensor system according to the present invention.
Figure 2:
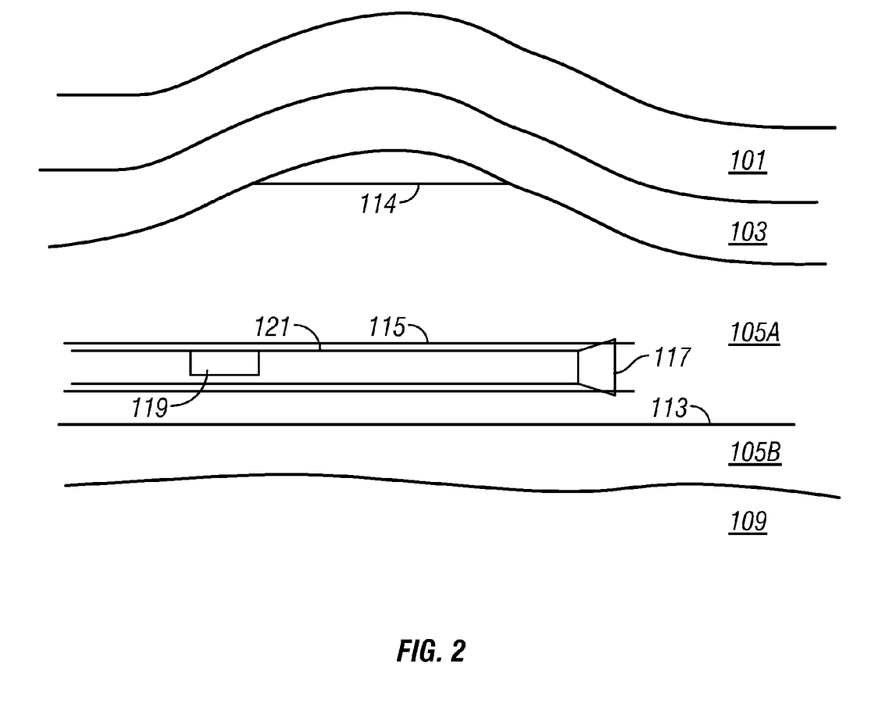
FIG. 2 is an illustration of a substantially horizontal borehole proximate to an oil/water contact in a reservoir, FIG. 3 (prior art) illustrates the 3DEX™ multi-component induction tool of Baker Hughes Incorporated.

FIG. 1 shows a schematic diagram of a drilling system 10 with a drillstring 20 carrying a drilling assembly 90 (also referred to as the bottomhole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. As would be known to those versed in the art, with coiled tubing, a rotary table is not used. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ typically placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In an exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur. The bottomhole assembly (BHA) of the present invention includes a propagation resistivity tool (discussed next) and a processor which processes the data acquired by the propagation resistivity tool and may control the direction of drilling based on the results of the processing.

Figure 4:
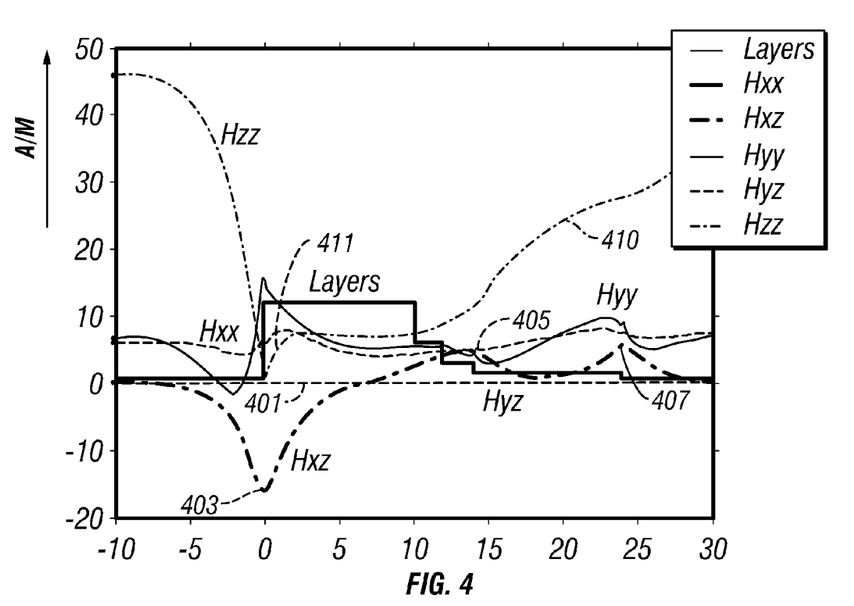
FIG. 4 shows a graph of a typical six-level anisotropic turbidite sequence along with responses of the five components to the applied RF magnetic field at 20 kHz.

FIG. 4 shows a case of a typical turbidite layer sequence. The lithology sequence from top to bottom of the model is shale, thick sand, followed by a transition to a low resistivity and electrically anisotropic sand-shale sequence. The resistivities of this bed layer structure are tabulated in Table 1.

| Resistivity Bed | Depth top boundary (ft) | Rh (Ω-m) | Rv (Ω-m) |
|---|---|---|---|
| 1 | −10 | 0.6 | 0.6 |
| 2 | 0 | 12 | 12 |
| 3 | 10 | 6 | 6 |
| 4 | 12 | 3 | 3 |
| 5 | 14 | 1.5 | 1.5 |
| 6 | 24 | 0.8 | 0.8 |

It is to be noted that in FIG. 4 does not show tool responses as a tool is moved along a wellbore: in each of the figures, the borehole is horizontal. What is shown is the response of the tool in a fixed position within a horizontal (or highly deviated) borehole placed at a varying distance with respect to the top resistivity layer interface described by the curve "Layer" The sequence contains six overall bed layers, the resistivity of all layers being isotropic except for the fifth bed layer. The tool operates at multiple frequencies. Only the 20 kHz response is shown here. In thick beds, when the boundaries are more than 5 feet away from the tool, the $H_{xz}$ response is zero (401). The $H_{xz}$ response starts showing sensitivity to a bed boundary when that bed boundary is within 5 feet (1.524 m) of the tool. If the tool is moving from a region of low resistivity to a region of high resistivity, $H_{xz}$ has a negative response (403). Similarly, when the tool is moving from a region of high resistivity to a region of low resistivity, the $H_{xz}$ response is positive (405 and 407). $H_{xz}$ experiences a positive deflection in the isotropic (fifth) bed layer (410).

Figure 5:
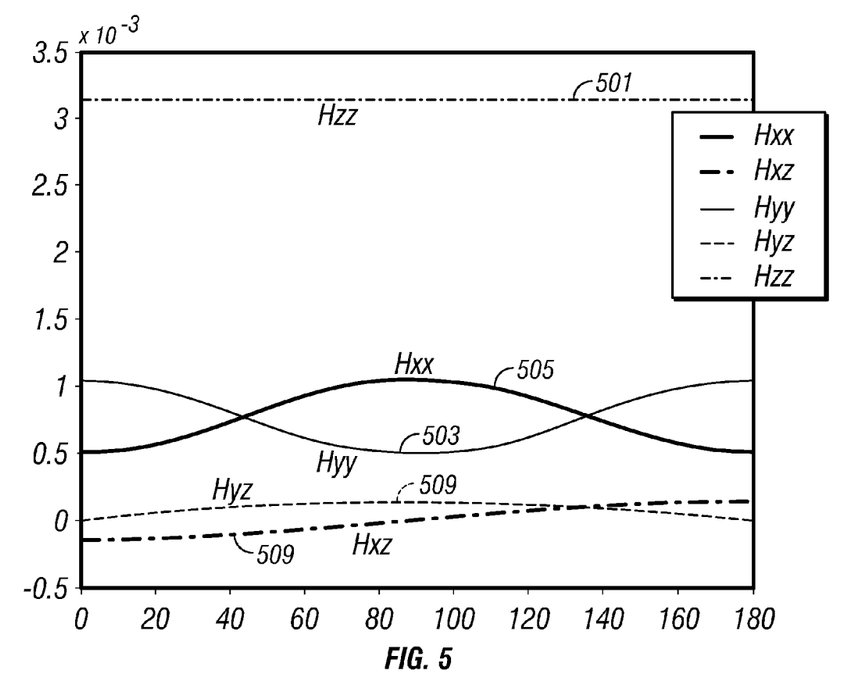
FIG. 5 shows the five component responses to the applied 200-kHz RF magnetic field as the tool is rotated through 180° inside a horizontal borehole within the second bed of FIG. 4.

FIG. 5 shows graphs of response curves of a horizontal borehole centered at the midpoint (depth of 5 feet) of the second bed layer of FIG. 4. In the horizontal position, the layer above has different resistivities than the layer below, having consequences for the magnetic responses. The depth of the tool is fixed, and the tool is rotated about its longitudinal axis over a 180° variation of the toolface angle. The tool is operated at 200 kHz. Since the tool is horizontal, the $H_{zz}$ (501) component is constant with rotation. The $H_{yy}$ (503) and $H_{xx}$ (505) components show a variation with toolface angle and interchange their values around a mean value as the tool rotates. It can be shown that the average of $H_{xx}$ and $H_{yy}$ is a constant independent of rotation. However, tool dip, location and the formation type do affect the values of the responses. The angular period of sinusoidal variation with respect to the relative azimuthal angular orientation of $H_{xx}$ and $H_{yy}$ is half a rotation (180°) Likewise $H_{xz}$ (507) and $H_{yz}$ (509) also oscillate but have a period of once per full rotation (360°).

As can be seen from FIG. 4, the various multicomponent measurements are sensitive to the position of the bed boundary relative to the borehole. However, it can be seen that the components $H_{yz}$ and $H_{xz}$ are typically much smaller than the components $H_{xx}$ and $H_{yy}$. The Fanini patent teaches a method in which curve fitting is done to a plurality of the multicomponent measurements for use in reservoir navigation. In the present invention, attention is directed towards the $H_{zx}$ measurement. This is not shown in FIG. 3, but from reciprocity, the $H_{zx}$ measurement will exhibit a similar variation with tool rotation as does the $H_{xz}$ measurements.

Figure 6:
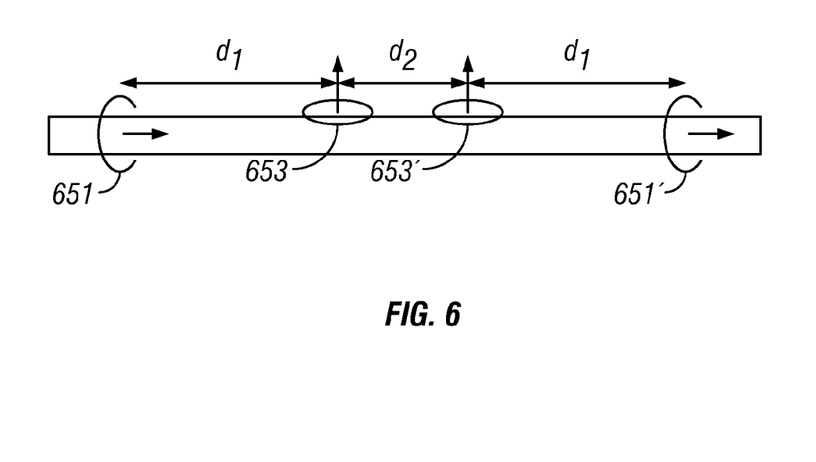
FIG. 6 illustrates the transmitter and receiver configuration of an induction resistivity tool suitable for use with the method of the present invention.

FIG. 6 shows an azimuthal resistivity tool configuration suitable for use with the method of the present invention. It should be noted that the method of the present invention may also be used with any multicomponent tool, including the 3DEX tool discussed above. The tool illustrated in FIG. 6 is a modification of the basic 3DEX tool of FIG. 3 and comprises two transmitters 651, 651' whose dipole moments are parallel to the tool axis direction and two receivers 653, 653' that are perpendicular to the transmitter direction. In one embodiment of the invention, the tool operates at 400 kHz frequency. When the first transmitter fires, the two receivers measure the magnetic field produced by the induced current in the formation. This is repeated for, the second transmitter. The signals are combined in following way:

$$H_{T1}=H_2-(d_1/(d_1+d_2))^3 \cdot H_1$$

$$H_{T2}=H_1-(d_1/(d_1+d_2))^3 \cdot H_2 \qquad (1).$$

Here, $H_1$ and $H_2$ are the measurements from the first and second receivers, respectively, and the distances $d_1$ and $d_2$ are as indicated in FIG. 6. The tool rotates with the BHA and in an exemplary mode of operation, makes measurements at 16 angular orientations 22.5° apart. The measurement point is at the center of two receivers. In a uniform, isotropic formation, no signal would be detected at either of the two receivers. The invention makes use of cross component measurements, called principal cross-components, obtained from at least one transmitter and one receiver, including two transmitters disposed on either side of at least one receiver. It should further be noted that using well known rotation of coordinates, the method of the present invention also works with various combinations of measurements as long as they can be rotated to give the principal cross components.

Figure 7A:
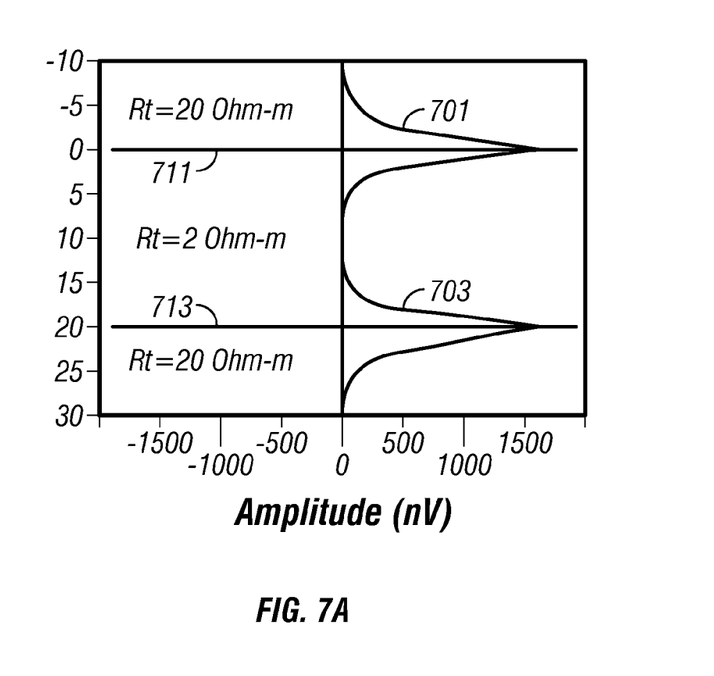
FIGS. 7a, 7b show exemplary responses to a model in which a layer of resistivity 2 Ω-m is positioned between two layers of resistivity 20 Ω-m.
Figure 7B:
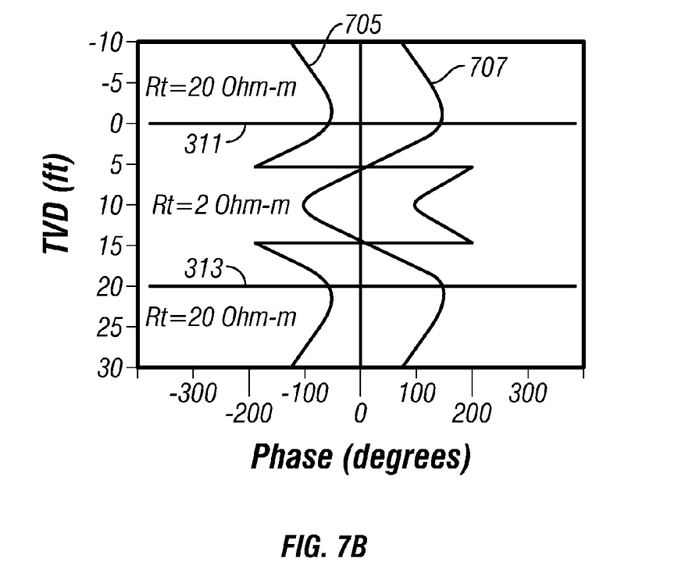
Figure 7C:
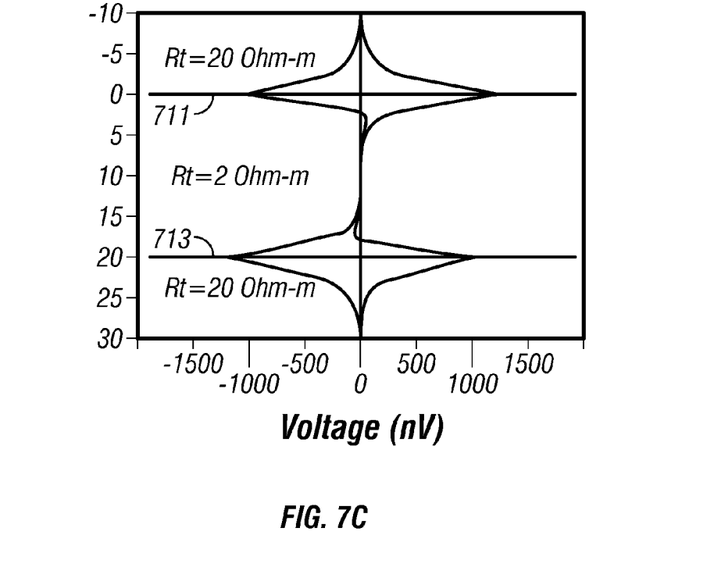
FIGS. 7c, 7d show the in-phase and quadrature component response for two transmitters positioned on opposite sides of a receiver.
Figure 7D:
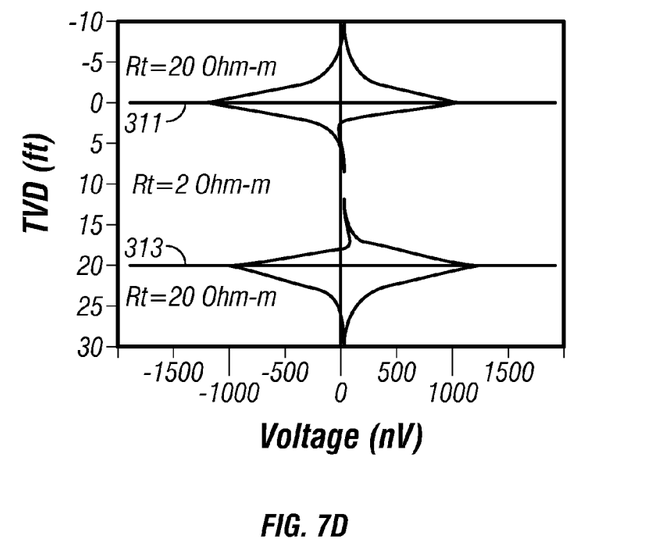

FIGS. 7a, 7b show exemplary responses to a model in which a layer of resistivity 2 Ω-m is positioned between two layers of resistivity 20 Ω-m. The bed boundaries are 20 ft (6.096 m) apart and are indicated by 711, 713 in FIG. 5a and by 711', 713' in FIG. 5b. 701, 703 are the amplitudes of the $T_1$ and $T_2$ responses (given by eqn. 1) when the receivers are oriented vertically, while 705, 707 are the phases of the $T_1$ and $T_2$ responses. Again, it should be emphasized that the responses correspond to measurements made with the tool parallel to the bed boundaries. This is consistent with the results of Merchant (which were for a single transverse receiver). FIG. 7c gives the in-phase and quadrature components of $T_1$ and FIG. 7d gives the in-phase and quadrature components of the $T_2$ response.

Figure 8A:
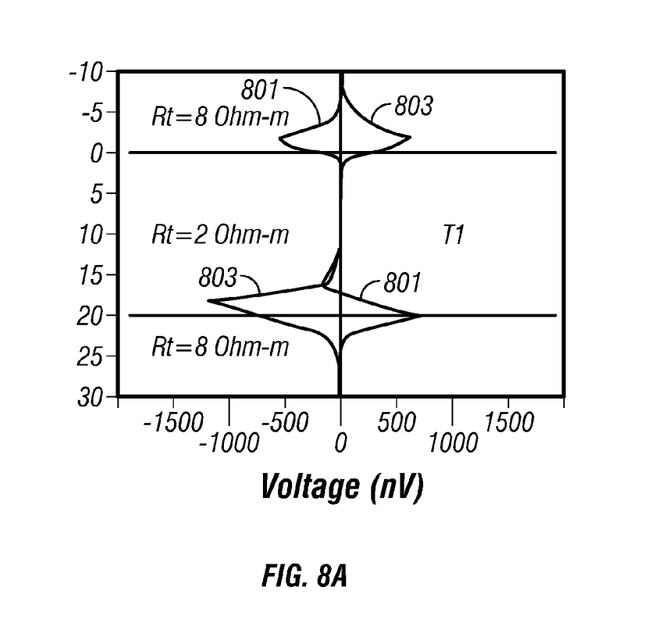
FIGS. 8a, 8b show the effect of anisotropy on a single transmitter response in a deviated borehole.
Figure 8B:
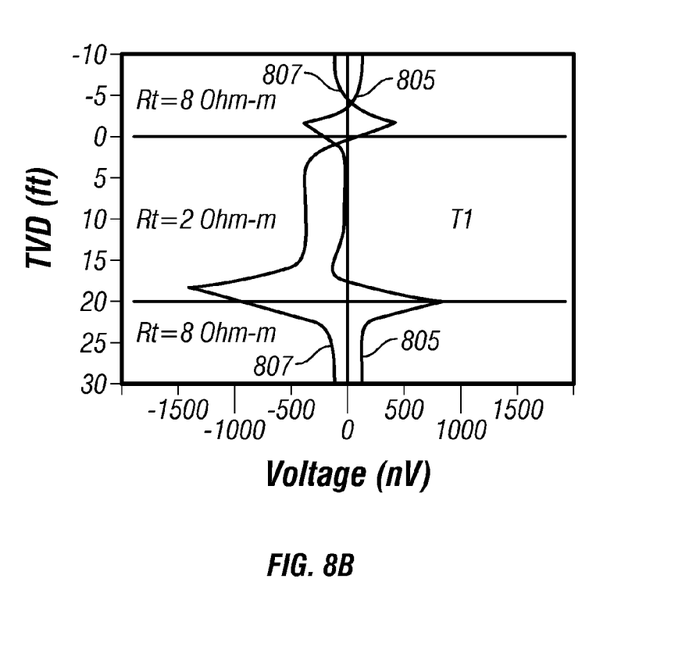

Turning now to FIGS. 8a, 8b, the in-phase 801 and quadrature 803 components of the $T_1$ response are shown for a borehole with a 60° inclination to the bed boundary. In FIG. 8a, the anisotropy factor is 1.0 while in FIG. 8b, the anisotropy factor is 2.0. The in-phase and quadrature components are shown by 805, 807 respectively. Several observations may be made about FIGS. 8a, 8b.

First, the "horns" of the curves are not at the bed boundary. More importantly, in FIG. 8a, the in-phase and quadrature components are both substantially zero at some distance away from the bed boundary. Since FIG. 8a is for an isotropic model, this shows that the cross-component response of the tool for an isotropic earth formation may be used as a distance indicator for reservoir navigation. The same is not true for FIG. 8b (anisotropic earth formation): even at some distance away from the bed boundaries, there are non-zero values for the in-phase and quadrature components. This means that in a deviated borehole, the response depends both on the distance to the bed boundary as well as on the anisotropy factor. The baseline is different from zero and is caused by anisotropy.

Figure 8C:
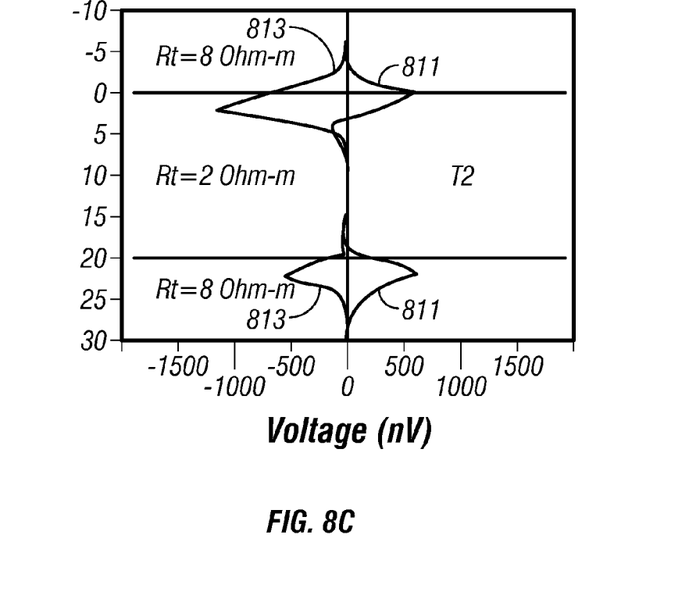
FIGS. 8c, 8d show the effect of anisotropy on the response of a single transmitter positioned on the opposite side of the transmitter of FIGS. 7a, 7b in a deviated borehole.
Figure 8D:
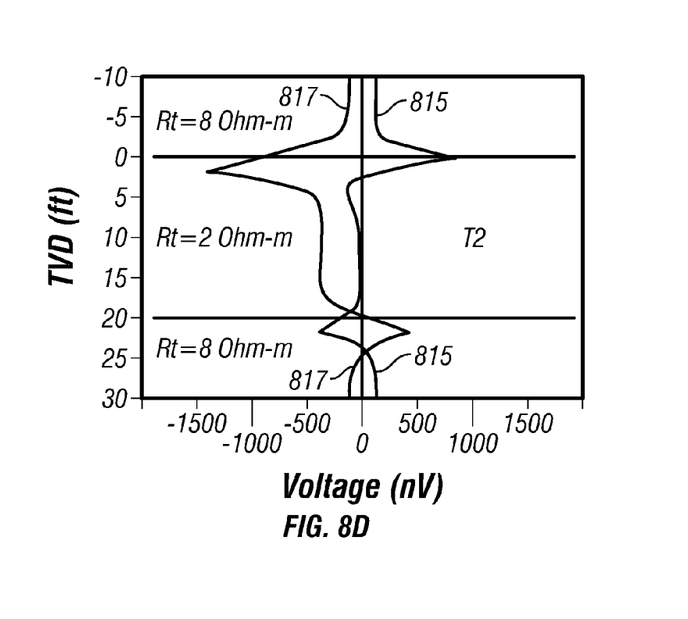

Similar conclusions follow from FIGS. 8c, 8d which are responses of the $T_2$ transmitter corresponding to FIGS. 8a, 8b. here, 811, 813 are the in-phase and quadrature components for isotropic formations while 815, 817 are the in-phase and quadrature components for the anisotropic formation. Additionally, comparison of FIG. 8a with 8c and of FIG. 8b with 8d shows that the offset of the "horns" from the bed boundaries are in opposite directions for the two transmitter signals, something that could have been expected as the nominal measuring point is midway between the two receivers. In addition, it is noted that the baseline response for the two transmitters has the same sign.

One of the problems that is commonly encountered in the use of multicomponent logging tools results from misalignment of the coils. Theoretically, if the tool is in an infinite homogenous isotropic medium, the x-component signal resulting from excitation of a z-coil (the $H_{zx}$ signal) should be zero. This requires precise alignment of the coils to orthogonality. In the absence of precise alignment, there will be a principal cross-component error signal that will contaminate the desired principal cross-component signal that is indicative of distance to the bed boundary. In the presence of the error signal, it is difficult to get an accurate estimate of the distance to a bed boundary using the method discussed above.

The present invention recognizes the fact that the effect of a misalignment is a constant value to the principal cross-component in a homogenous isotropic medium. Using this fact, and the fact that the magnitude of the principal cross-component signal in a layered earth formation varies with systematically with the toolface angle, one embodiment of the present invention substantially reduces the effect of the misalignment.

As noted above, the variation of the signals with toolface angle for a multicomponent induction logging tool is sinusoidal in nature. U.S. Pat. No. 6,819,111 to Fanini et al teaches this sinusoidal variation and the use of curve fitting of measurements binned by toolface angles. The sinusoidal variation has been discussed above with reference to FIG. 3. Not recognized in Fanini was the effect of the misalignment, particularly on the principal cross-components. In addition, Fanini did not recognize the importance of the bias term in the curve fitting.

In the present invention, a curve fitting is done to the measured values of the $H_{zx}$ signal as a function of toolface angle. The toolface angle is measured by using a suitable orientation device such as a magnetometer or an accelerometer. In one embodiment of the invention, measurements are made sixteen times over a single rotation of the tool, i.e., over 360° rotation. Denoting by $f_i$ the measured signal at toolface angle $\theta_i$, the following quantities are computed:

$$\mathcal{R} = \frac{1}{\pi}\sum_{i=1}^{16} f_i \cos\theta_i, \quad (2)$$

$$\mathcal{J} = \frac{1}{\pi}\sum_{i=1}^{16} f_i \sin\theta_i, \quad (3)$$

$$\Phi = \tan^{-1}\left(\frac{\mathcal{J}}{\mathcal{R}}\right), \quad (4)$$

$$A = \sqrt{\mathcal{R}^2 + \mathcal{J}^2}, \quad (5)$$

and $$f_i^* = f_i - \frac{1}{16}\sum_{i=1}^{16} f_i. \quad (6)$$

The quantity A is the amplitude of the sinusoidal signal and is what is used in the present invention as a distance indicator to a bed boundary. The quantity $\Phi$ is indicative of the direction to the bed boundary. The term $$\frac{1}{16}\sum f_i$$

on the right side of eqn. (6) is the bias in the measurements.

Those versed in the art would recognize that in addition to coil misalignment, the bias could also be due to drift in the amplifier gains and other systematic electronic noise. In addition to the bias, the measurements may also be corrupted by random noise that is uncorrelated from one measurement to the next. The fitting procedure described above smoothes the effect of random noise and greatly reduces the effect of the bias. It should further be noted that the bias removal/sinusoidal curve fitting may be used in conjunction with measurements made with either a single transmitter or the dual transmitter arrangements, and with the in-phase or the quadrature signal components. For the dual-transmitter configuration of FIG. 6 where the combined signal given by eqn. (1) is used, the bias removal should be done before using eqn. (1). It should further be noted that the method of bias removal and sinusoidal curve fitting is not limited to the principal cross-component measurements and may be used with other components such as the xx-, and yy-components.

In one embodiment of the invention, the measurements are binned so as to accumulate measurements over a plurality of rotations of the tool. The binning procedure is discussed, for example, in Fanini. This makes it possible to improve the quality of the fit as measured by known statistical measures of goodness of fit. Using known statistical techniques, it is also possible to identify and discard portions of the data with poor quality. In one embodiment of the invention, correction is made for a non-uniform rate of rotation of the tool using the method described in U.S. patent application Ser. No. 10/771,675 of Estes et al., having the same assignee as the present invention and the contents of which are incorporated herein by reference.

Figure 9:
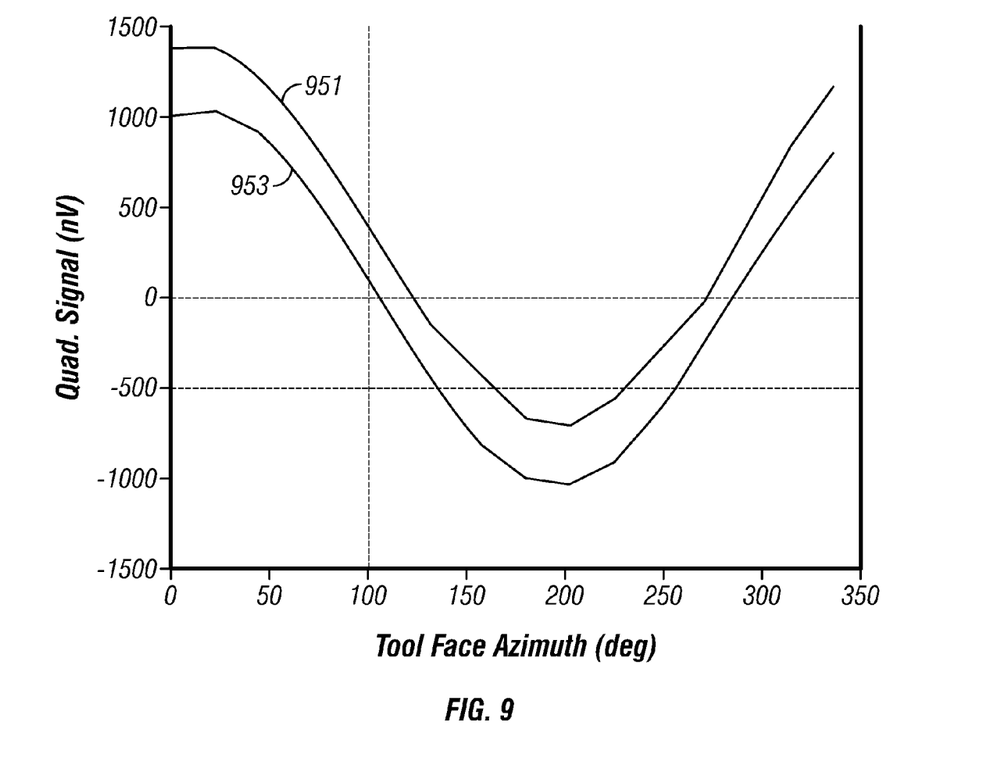
FIG. 9 shows an example of bias removal and sinusoidal curve fitting of principal cross-component measurements at a plurality of toolface angles.

Turning now to FIG. 9, the result of using the bias estimation procedure are shown. The abscissa is the toolface angle and the ordinate is an exemplary principal cross-component signal measured during rotation of the logging tool in an earth formation. The curve 951 is the raw data while the curve 953 is the corrected data given by eqn. (6). In this particular example, the bias is of the order of 300 nV. As can be seen from the examples shown above in FIGS. 7-8, a bias of 300 nV can produce a significant error in the estimated distance to an interface. The random noise in the curves fitting is relatively small (of the order of 10 nV).

Figure 10:
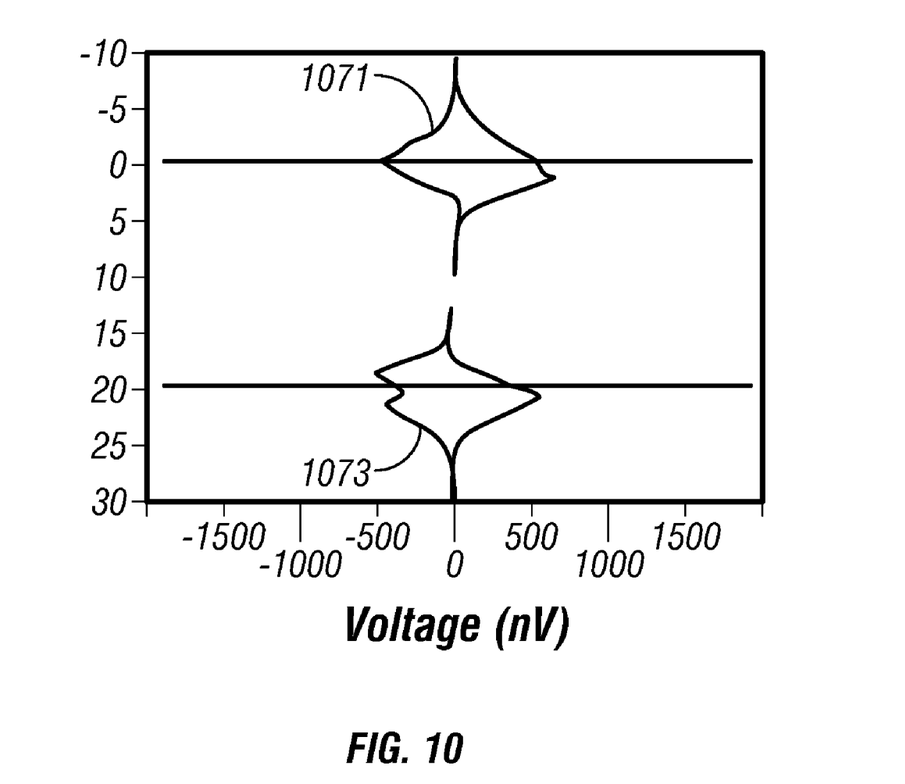
FIG. 10 depicts the improvement in prediction of distances to bed boundaries using the method of the present invention.

An example of the improvement in distance determination is depicted in FIG. 10. Shown in FIG. 10 is a line 1071 representing approximately 300 nV, the bias in the measurements of FIG. 9. The intersection of 1071 with the response curve at the depth 103 indicates that with a 300 nV bias, the distance to the bed boundary can only be determined when the tool is within 3 ft. (0.914 m). If, the bias is removed, and only a noise of the order of 10 nV is present, the determination can easily be made at about twice that distance, i.e., at about 6 ft. (1.83 m).

The invention has been described above with reference to a drilling assembly conveyed on a drillstring. However, the method and apparatus of the invention may also be used with a drilling assembly conveyed on coiled tubing. When the measurements are made with a sensor assembly mounted on a BHA during drilling operations, the determined distance can be used by a downhole processor to alter the direction of drilling of the borehole. Alternatively or additionally, the distance information may be telemetered to the surface where a surface processor or a drilling operator can control the drilling direction. The method may also be used in wireline applications to determine distances to bed boundaries away from the borehole. This may be useful in well completion, for example, in designing fracturing operations to avoid propagation of fractures beyond a specified distance. For both coil tubing and wireline operations, it would be necessary to rotate the logging tool. This may be done by using a downhole motor with coiled tubing, or a motor with a protective sleeve for wireline operations.

It should further be noted that while the invention has been described with a dual transmitter, dual receiver configuration, the method of the invention is equally applicable with a dual transmitter single receiver arrangement. In such a situation, the raw signals in the single transmitter may be used (instead of the difference signal given by eqn. 1).

The processing of the data may be done by a downhole processor to give corrected measurements substantially in real time. Alternatively, the measurements could be recorded downhole, retrieved when the drillstring is tripped, and processed using a surface processor. Implicit in the control and processing of the data is the use of a computer program on a suitable machine readable medium that enables the processor to perform the control and processing. The machine readable medium may include ROMs, EAROMs, EPROMs, EEPROMs, Flash Memories and Optical disks.

The foregoing description is directed to particular embodiments of the present invention for the purpose of illustration and explanation it will be apparent, however, to one skilled in the art that many modifications and changes to the embodiments set forth above are possible without departing from the scope and the spirit of the invention. It is intended that the following claims be interpreted to embrace all such modifications and changes.

The scope of the invention may be better understood with reference to the following definitions:

anisotropic: exhibiting properties with different values when measured in different directions;

coil: one or more turns, possibly circular or cylindrical, of a current-carrying conductor capable of producing a magnetic field;

EAROM: electrically alterable ROM;

EEPROM: EEPROM is a special type of PROM that can be erased by exposing it to an electrical charge.

EPROM: erasable programmable ROM;

flash memory: a nonvolatile memory that is rewritable;

horizontal resistivity: resistivity in a direction normal to an axis of anisotropy, usually in a direction parallel to a bedding plane of an earth formation;

induction: the induction of an electromotive force in a circuit by varying the magnetic flux linked with the circuit.

machine readable medium: something on which information may be stored in a form that can be understood by a computer or a processor;

Optical disk: a disc shaped medium in which optical methods are used for storing and retrieving information;

Principal cross-component: a signal obtained in a transverse receiver coil by excitation of a longitudinal transmitter coil, in a longitudinal receiver coil by excitation of a transverse transmitter coil.

Quadrature: 90° out of phase;

ROM: Read-only memory.

Toolface angle: the orientation angle of the bent housing or sub in the borehole with respect to a reference such as high side of the borehole vertical resistivity: resistivity in a direction parallel to an axis of anisotropy, usually in a direction normal to a bedding plane of an earth formation

What is claimed is:

1. A method of determining a resistivity of an earth formation penetrated by a borehole, the method comprising:
   (a) conveying a logging tool to at least one depth within said borehole;
   (b) obtaining principal cross-component measurement at each of a plurality of tool-face angles of the logging tool at the at least one depth in the borehole; and
   (c) determining said resistivity from said measurements by correcting for an effect of a misalignment in a least one of the measurements, the determination including a sinusoidal curve fitting of the measurements.

2. The method of claim 1 wherein the sinusoidal curve determines bias due to the misalignment.

3. The method of claim 2 wherein correcting for the bias further comprises using a relation of the form:

$$f_i^* = f_i - \frac{1}{N}\sum_{i=1}^{N} f_i$$

where $f_i$ are the measurements at each of the plurality of N tool-face angles.

4. The method of claim 1 wherein the principal cross-components comprise zx measurements.

5. The method of claim 1 wherein obtaining the principal cross-component measurements further comprises exciting a pair of transmitter coils disposed on the logging tool on opposite sides of at least one receiver coil.

6. The method of claim 1 further comprising using the determined resistivity to estimate a distance to an interface in the earth formation.

7. The method of claim 6 wherein the logging tool is part of a bottomhole assembly (BHA) conveyed on a drilling tubular, the method further comprising controlling a direction of drilling based on the estimated distance.

8. An apparatus for evaluating an earth formation penetrated by a borehole, the apparatus comprising:
   (a) at least one transmitter and at least one receiver on a logging tool configured to be conveyed to at least one depth within said borehole; and
   (b) a processor configured to obtain an estimate of a resistivity of the formation from at least one principal cross-component measurement obtained from the at least one transmitter and the at least one receiver at each of a plurality of tool-face angles of the logging tool at the at least one depth in the borehole, the estimate conecting for an effect of misalignment in at least one of the measurements, the determination being based at least in part on a sinusoidal curve fitting of the measurements.

9. The apparatus of claim 8 wherein the processor is configured to to perform the sinusoidal curve fitting to determine a bias due to the misalignment.

10. The apparatus of claim 9 wherein the processor is configured to correct for the bias by further using a relation of the form:

$$f_i^* = f_i - \frac{1}{N}\sum_{i=1}^{N} f_i$$

where $f_i$ are the measurements at each of the plurality of N tool-face angles.

11. The apparatus of claim 8 wherein the at least one transmitter has a coil with an axis parallel to a longitudinal axis of the tool and the at least one receiver has a coil with an axis transverse to the longitudinal axis of the tool.

12. The apparatus of claim 11 wherein the at least one transmitter further comprises a pair of transmitters disposed on opposite sides of the at least one receiver.

13. The apparatus of claim 8 wherein the processor is further configured to use the determined resistivity to estimate a distance to an interface in the earth formation.

14. The apparatus of claim 8 wherein the logging tool is part of a bottomhole assembly (BHA) configured to be conveyed on a drilling tubular and wherein the processor is further configured to control a direction of drilling based on the estimated distance.

15. The apparatus of claim 8 further comprising a wireline which is configured to convey the logging tool into the borehole.

16. The apparatus of claim 8 further comprising an orientation device configured to provide an output indicative of the toolface angle of the logging tool.

17. The apparatus of claim 8 wherein the processor is configured to rotate measurements made by the at least one transmitter and the at least one receiver to obtain the principal cross-components.

18. A computer readable medium for use with an apparatus for determining a resistivity of an earth formation penetrated by a borehole, the apparatus comprising:
 (a) at least one transmitter and at least one receiver on a logging tool configured to be conveyed to at least one depth within said borehole;

the medium comprising instructions which enable a processor to:
 (b) estimate of the resistivity from at least one principal cross-component measurement made by the at least one transmitter and the at least one receiver at each of a plurality of tool-face angles of the logging tool at the least one depth in the borehole, the estimate correcting for an effect of misalignment in at least one of the measurements, the estimation being based at least in part on a sinusoidal curve fitting.

19. The medium of claim 18 further comprising at least one of (i) a ROM, (ii) an EAROM, (iii) an EPROM, (iv) an LEPROM, (v) a flash memory, and (vi) an optical disk.

* * * * *